United States Patent [19]
Miyota et al.

[11] Patent Number: 4,792,371
[45] Date of Patent: Dec. 20, 1988

[54] METHOD OF AND APPARATUS FOR FORMING TRIM COVER

[75] Inventors: Akihiro Miyota; Hidetaka Shinoda, both of Saitama, Japan

[73] Assignee: Tokyo Seat Corporation Limited, Asaka, Japan

[21] Appl. No.: 114,158

[22] Filed: Oct. 27, 1987

[30] Foreign Application Priority Data

Oct. 27, 1986 [JP] Japan ................................ 61-256522
Sep. 29, 1987 [JP] Japan ................................ 61-245650

[51] Int. Cl.⁴ ........................ B32B 31/08; B32B 31/18; B32B 31/22
[52] U.S. Cl. ................................... 156/131; 156/213; 156/257; 156/267; 156/268; 156/459; 156/461; 156/470; 156/471; 156/510; 156/517; 156/582
[58] Field of Search ............... 156/211, 213, 257, 267, 156/268, 269, 475, 517, 153, 154, 78, 196, 459, 461, 470, 471, 510, 582

[56] References Cited

U.S. PATENT DOCUMENTS

| | | | |
|---|---|---|---|
| 2,744,564 | 5/1956 | Woodburn | 156/268 |
| 2,792,320 | 3/1957 | Bower | 156/79 |
| 3,025,194 | 3/1962 | Adams | 156/201 |
| 3,071,180 | 1/1963 | Finger et al. | 156/213 |
| 3,456,701 | 7/1969 | Cornell | 156/211 |
| 3,748,207 | 7/1973 | Campbell et al. | 156/359 |
| 4,040,881 | 8/1977 | Wallace | 156/213 |

*Primary Examiner*—Michael Wityshyn
*Attorney, Agent, or Firm*—Helfgott & Karas

[57] ABSTRACT

A method of forming trim cover being one of elements constituting a seat which is used for furniture or as an automobile seat, comprises feeding an assembly of a sheet of covering material and wadding material, with the covering sheet side of the assembly turned upward, onto support means for receiving and supporting the assembly thereon. The support means has at least one hole of a desired predetermined shape. A portion of the assembly substantially positionally corresponding to at least one hole is pressed downwardly to cause a portion of the wadding material of the assembly positionally corresponding to the hole of the support means to be protruded downwardly from the support means through the hole of the support means. The protruded portion of the wading material of the assembly is cut, while the same portion of the assembly is still pressed downwardly. The assembly is advanced to a backing sheet laminating station. A sheet of the backing material sticks onto the wadding material side of the assembly by means of backing sheet sticking means, while the same portion of the assembly is pressed against the backing sheet sticking means, whereby a finished product having at least one indent of a predetermined shape appreciated as an ornamental pattern therein may be produced. Also, an apparatus for forming trim cover is disclosed.

24 Claims, 9 Drawing Sheets

PRIOR ART
FIG. 1
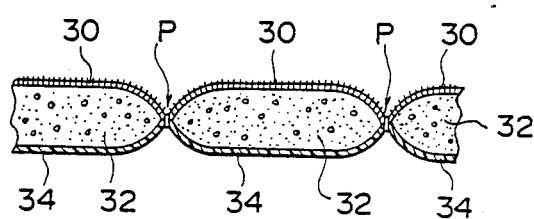
PRIOR ART
FIG. 2A
PRIOR ART
FIG. 2B
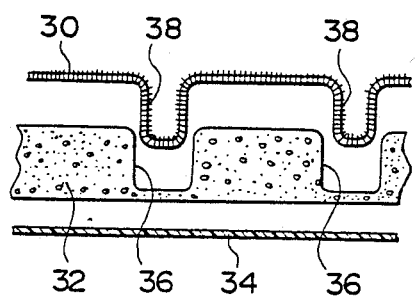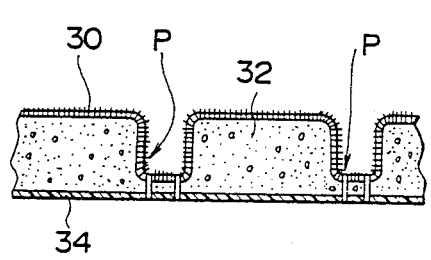
FIG. 3
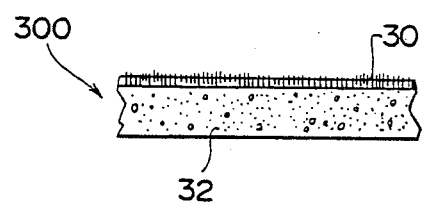

METHOD OF AND APPARATUS FOR FORMING TRIM COVER

BACKGROUND OF THE INVENTION

1. Field of the Invention

This invention relates to a method and apparatus for forming trim cover and more particularly to an improved method and apparatus for forming trim cover being one of elements constituting a seat which is used as furniture or an automobile seat.

2. Description of the Prior Art

In general, trim cover of this type is made by integrally uniting a sheet of covering material such as fabric, synthetic leather or the like, a sheet of backing material and wadding material such as urethane slab or the like sandwiched between the covering and backing sheet, in which assembly of the three elements hollows appreciated as ornamental patterns are formed for decorating purposes.

Referring now to FIGS. 1 and 2, two conventional methods of forming trim cover will be described in order to facilitate understanding of the present invention.

In FIG. 1 illustrating one conventional method of forming trim cover, a sheet 30 of covering material, wadding material 32 and a sheet 34 of backing material are assembled in superposed relation, at a surface of which assembly of the three elements 30, 32 and 34 hollow patterns P are formed by stitching or welding predetermined portions of the assembly. In this conventional method, when the stitching or welding operation is carried out, the covering sheet 30 will be pulled toward the stitched or welded portion of the assembly, so that the wadding material 32 is thrust downwardly so as to be bulged out together with the backing sheet 34. Therefore, with this conventional method, it is not possible to keep the degree of the ups and downs of the patterns formed on the surface of the assembly large and in addition, it is inevitable that the appearance of the formed hollow patterns P of the assembly will become indistinct.

FIG. 2 shows the other conventional method of forming trim cover which was thought out in order to overcome the disadvantages of the above-mentioned conventional method. In FIG. 2A, channels 36 of a substantially U-shape in vertical section are formed in wadding material 32, a channeled surface side of which wadding material 32 is then covered with a sheet 30 of covering material. At this time, portions 38 of the sheet 30 of covering material positionally corresponding to the channeled portions 36 of the wadding material 32 are received in the corresponding channels 36 of the wadding material 32 in a manner to cover the walls of the wadding material 32 forming the channels 36. This assembly of the covering sheet 30 and wadding material 32 is then secured to a sheet 34 of backing material by sewing or welding the channeled portions of the assembly and the backing sheet 34 together, as shown in FIG. 2B. Thus, a trim cover having concave patterns P at the surface thereof is produced. With this conventional method, when the wadding material 32 is covered with the covering sheet 30, this assembling operation requires making of tucks in the portions 38 of the covering sheet 30 positionally corresponding to the channeled portions of the wadding material 32 in order to align the positionally corresponding portions 38 of the covering sheet 30 with the channels 36 of the wadding material 32. This tucking will leave wrinkles and waviness on the covering sheet 30, resulting in detracting from the appearance of the finished product. In addition, such tucking operation will take a great deal of trouble.

SUMMARY OF THE INVENTION

It is therefore an object of this invention to provide a method and apparatus for forming trim cover which will ensure good appearance of the trim cover.

It is another object of this invention to provide a method and apparatus for forming trim cover which is capable of making the trim cover, the degree of ups and downs in indent patterns on the surface of which would be kept large.

It is still another object of this invention to provide a method and apparatus for forming trim cover which is capable of easily and efficiently making trim cover.

It is yet another object of this invention to provide a method and apparatus for forming trim cover which is capable of making trim cover having different ornamental patterns therein, in compliance with desire.

In accordance with one aspect of the present invention, there is provided a method of forming trim cover, comprising the steps of feeding wadding material previously laminated with a covering sheet, with the covering sheet side of said assembly facing upward, onto support means provided with at least one hole of a desired predetermined shape; pressing downwardly a portion of the assembly substantially positionally corresponding to at least one hole of the support means to cause said portion of the assembly to be dented and a portion of the wadding material of the assembly positionally corresponding to at least one hole of the support means to be protruded downwardly through the hole of the support means; cutting the downwardly protruded portion of the wadding material of the assembly, while still pressing downwardly the same portion of the assembly; advancing the assembly to a backing sheet laminating stage; and laminating the wadding material side of the assembly with a sheet of backing material while pressing downwardly the same portion of the assembly to further cause the same portion of the assembly to be dented.

According to a further aspect of the present invention, there is provided an apparatus for forming trim cover. The trim cover forming apparatus comprises a frame; support means carried by the frame for receiving and supporting thereon wadding material previously laminated with a sheet of covering material, the support means being provided with at least one hole of a desired predetermined shape; means carried by the frame and located next to the support means and for sticking a sheet of backing material onto a side of the wadding material opposite to that of the wadding material laminated with the covering sheet; means carried by the frame and located above the support means and backing sheet sticking means and for advancing the assembly while pressing downwardly a portion of the assembly substantially positionally corresponding to the at least one hole of the support means to cause said portion of the assembly to be dented and a portion of the wadding material of the assembly positionally corresponding to the hole of the support means to be protruded downwardly through the hole of the support means, the assembly advancing and pressing means including at least a first pressure member which is located just above the at least one hole of the support means and for pressing downwardly the portion of the assembly substantially positionally corresponding to the hole of the support means to continue to cause said portion of the assembly to be dented and a portion of the wadding material of the assembly positionally corresponding to the hole of the support means to be protruded downwardly through the hole of the support means, and a second pressure member which is located above the backing sheet sticking means and for pressing the same portion of the assembly against the sticking means to further cause the same portion of the assembly to be indented when the sticking means sticks the backing sheet onto the wadding material; and cutter means carried by the frame for cutting the portion of the wadding material of the assembly which is protruded downwardly through the at least one hole of the support means by means of the first pressure member.

BRIEF DESCRIPTION OF THE DRAWINGS

These and other objects and many of the attendant advantages of the present invention will be readily appreciated as the same becomes better understood by reference to the following detailed description when considered in connection with the accompanying drawings, in which like reference numerals designate like or corresponding parts throughout; wherein:

FIGS. 1 and 2A and 2B are each a schematic fragmentary front view of trim cover and of assistance in explaining a conventional method for forming trim cover;

FIG. 3 is a schematic fragmentary front view of wadding material previously laminated with a sheet of covering material;

DETAILED DESCRIPTION OF THE PREFERRED EMBODIMENTS

Figure 4:
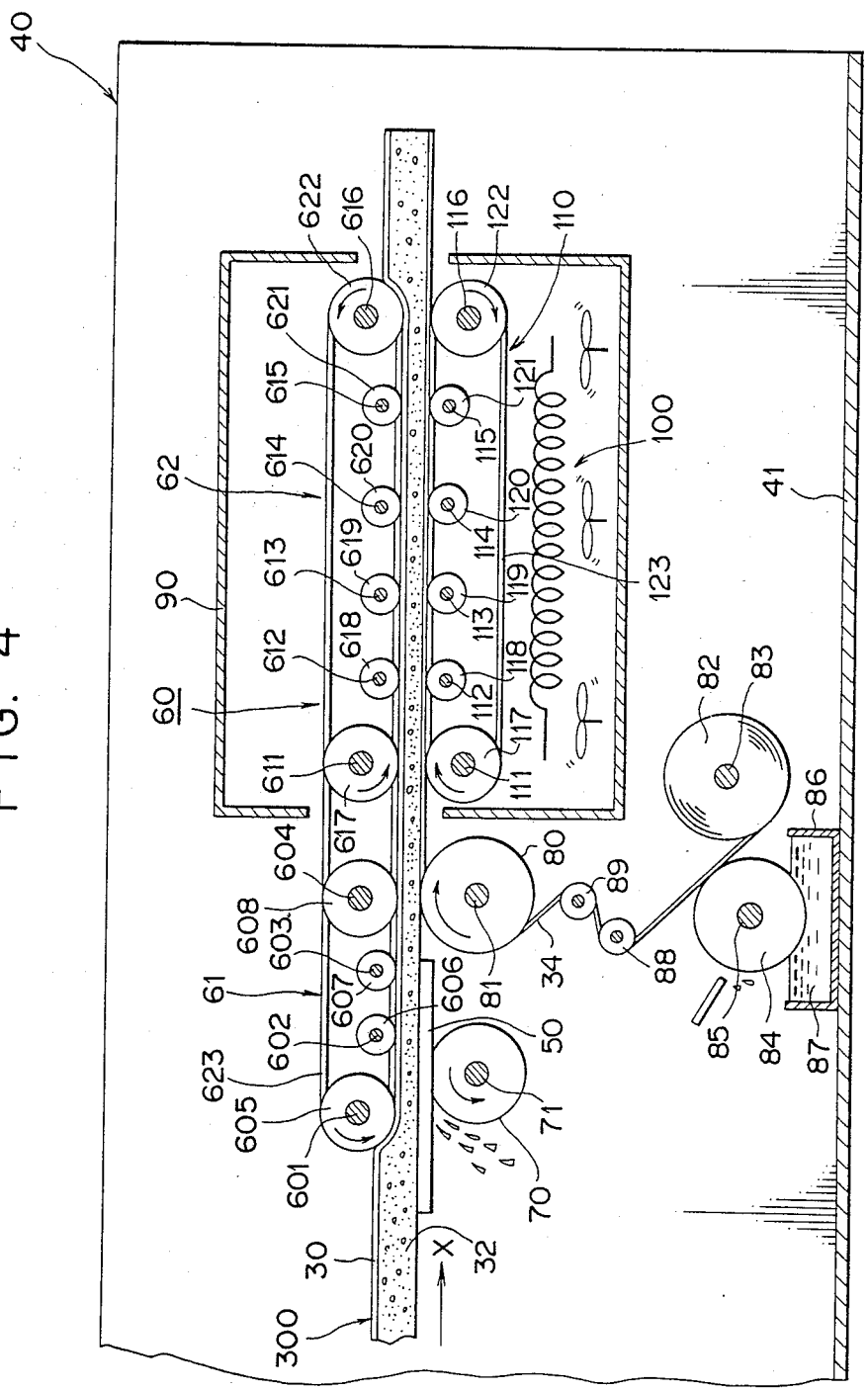
FIG. 4 is a schematic side view showing a first embodiment of an apparatus for performing a method of the present invention for making trim cover.

Now, an apparatus on which a method of forming trim cover according to the present invention may be performed will be described hereinafter with reference to the accompanying drawings.

In the method of the present invention, a continuous strip 300 of wadding material 32 previously laminated with a sheet 30 of covering material as shown in FIG. 3 is fed to an apparatus for forming trim cover according to the present invention. In this method, a precut wadding material previously laminated with a sheet of covering material may be fed to the apparatus. Also, the laminating of the wadding material 32 with the covering sheet 30 may be carried out, using hot melt adhesive. The method of the present invention generally comprises the steps of feeding the continuous assembly 300, pressing downwardly a portion of the assembly 300 to cause a portion of the wadding material 32 of the assembly 300 to be protruded downwardly, cutting the downwardly protruded portion of the wadding material 32 while still pressing downwardly the same portion of the assembly 300, and thereafter laminating the wadding material side of the assembly 300 with a backing sheet 34 while pressing downwardly the same portion of the assembly 300.

Figure 6:
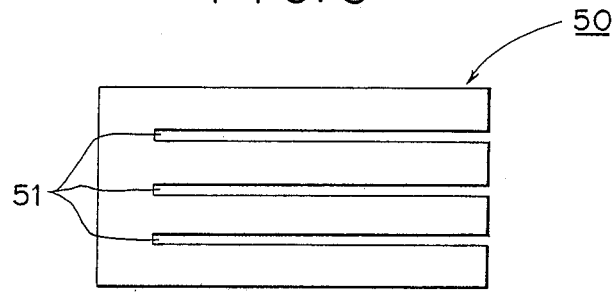
FIG. 6 is a plan view showing support means incorporated in the trim cover forming apparatus shown in FIG. 5.
Figure 7:
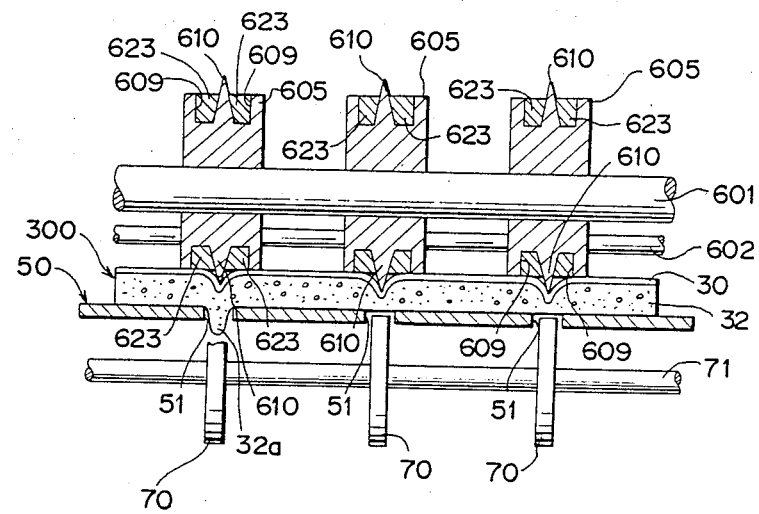
FIG. 7 is a vertical sectional view of the trim cover forming apparatus shown in FIG. 4, taken on a plane indicated in FIG. 5 by a line A—A, wherein a frame for a hot-air drying unit and other mechanisms located in the frame are removed for clarity of illustration.
Figure 8:
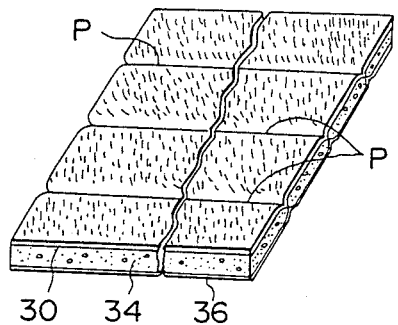
FIG. 8 is a schematic perspective view of a finished product made by the trim cover forming apparatus shown in FIG. 4, wherein the finished product is cut short.

Referring to FIGS. 4 to 7, description will be made at first of an apparatus for forming trim cover according to a first embodiment of this invention, which is adapted to form trim cover having a plurality of straight stripe-like indents P appreciated as ornamental patterns therein as shown in FIG. 8, which straight stripe-like indents P respectively extend along a longitudinal direction of the trim cover and are arranged at regular intervals along a width direction of the trim cover. The trim cover forming apparatus generally includes a frame 40; support means 50 carried by the frame 40 for receiving and supporting thereon a continuous strip of an assembly 300 of a covering sheet 30 and wadding material 32 which is fed, with the wadding material side of the assembly 300 being turned downward; a roller 80 located next to the support means 50 and for sticking a sheet 34 of backing material onto an underside of the wadding material 32 of the assembly 300; guide means 110 located next to the roller 80 and extending horizontally in an advancing direction X of the assembly 300 and for guiding the assembly 300; means 60 extending horizontally in the advancing direction X of the assembly 300 in a manner to be located above the support means 50, above the backing sheet sticking roller 80 and above the guide means 110 and for advancing the assembly 300 along the support means 50, over the backing sheet sticking roller 80 and then along the guide means 110 while pressing the assembly 300 in cooperation with, in turn, the support means 50, the backing sheet sticking roller 80 and the guide means 110; and roll cutter means 70 located below the support means 50. Spaces between the support means 50 and the assembly advancing and pressing means 60, between the backing sheet sticking roller 80 and the assembly advancing and pressing means 60, and between the guide means 110 and the assembly advancing and pressing means 60 are less than a thickness of the assembly 30. The assembly 300 is adapted to be advanced in these spaces.

Figure 5:
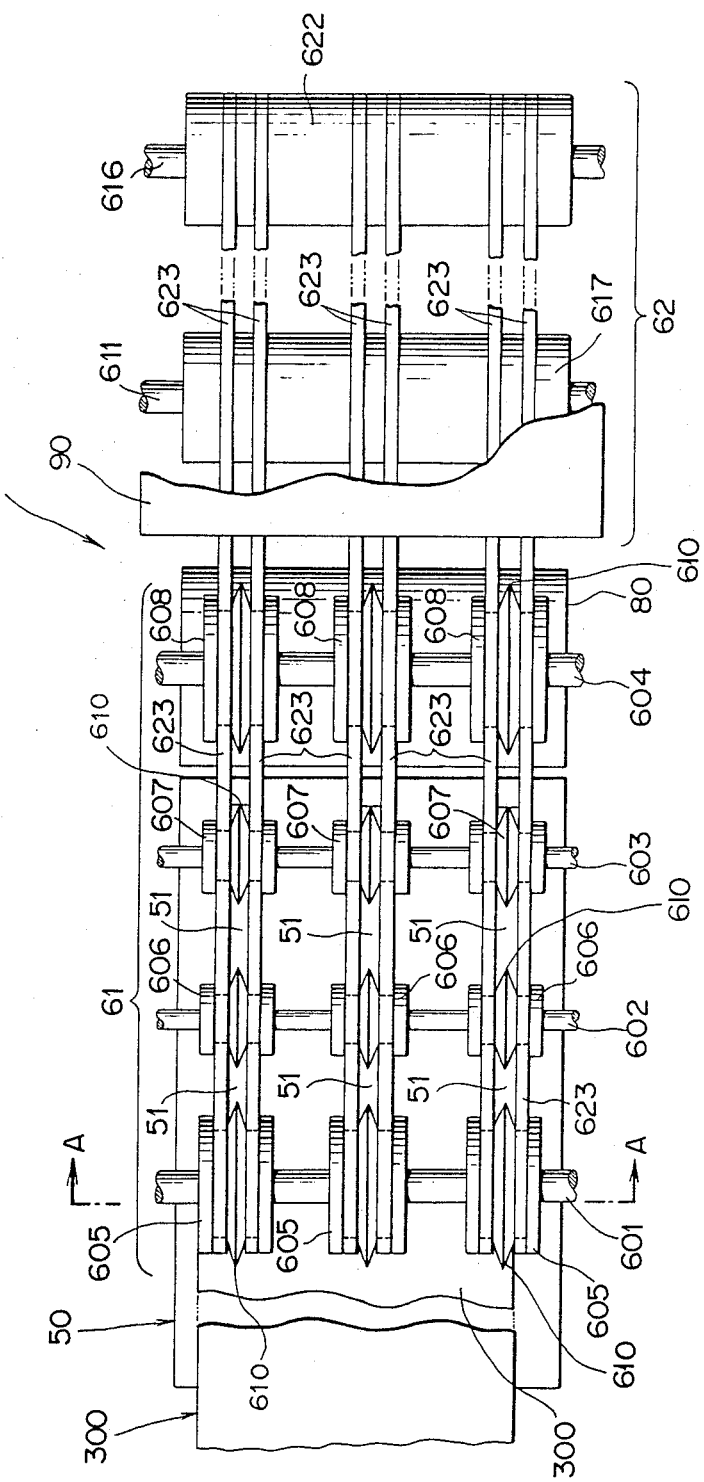
FIG. 5 is a partially cutaway plan view of the trim cover forming apparatus shown in FIG. 4.

In the illustrated embodiment, as can be seen from FIGS. 5 and 6, the support means 50 is of a flat plate-like shape and has a width (measured in a direction perpendicular to a sheet of FIG. 4) slightly more than that of the assembly 300 and is formed with a plurality of linear slits 51 respectively extending along a longitudinal direction thereof and arranged at regular intervals along the width direction thereof. The backing sheet sticking roller 80 has a width (measured in the direction perpendicular to the sheet of FIG. 4) corresponding to that of the support plate 50.

The assembly advancing and pressing means 60 comprises a first section 61 extending horizontally from a position above a portion of the support plate 50 to a position above the backing sheet sticking roller 80, and a second section 62 extending horizontally in the direction X as a continuation of the first section 61 to be led into a frame 90 for a hot-air drying unit 100 as viewed in FIG. 4.

As shown in FIGS. 4 and 5, the first section 61 of the assembly advancing and pressing means 60 comprises a plurality of shafts 601 to 604 which respectively extend in a direction perpendicular to the direction X and rotatably supported by the frame 40 in a manner to be arranged at intervals along a length of the first section 61, a series of pressure rollers 605 secured to the shaft 601, a series of small-sized pressure rollers 606 secured to the shaft 602, a series of small-sized rollers 607 secured to the shaft 603, and a series of pressure rollers 608 secured to the shaft 604. The pressure rollers on each of the shafts 601 to 604 correspond in number to the slits 51 of the support plate 50 and are arranged at intervals corresponding to the intervals between the slits 51 of the support plate 50 along an axial direction of the shaft. More particularly, of these pressure rollers 605 to 608, each of the pressure rollers 605, each of the pressure rollers 606 and each of the pressure rollers 607 are secured to the shafts 601, 602 and 603, respectively, in a manner to be each located right above a portion of the length of the corresponding one of the slits 51 of the support plate 50, while the pressure rollers 608 are secured to the shaft 604 in a manner to be respectively located right above portions of the backing sheet sticking roller 80 which correspond to portions on horizontal extension lines of the slits 51 of the support plate 50. As can be seen by reference to FIGS. 5 and 7, each of the pressure rollers on each of the shafts 601 to 604 is provided with two circumferential grooves 609 and a circumferential tapered projection 610 arranged between the two circumferential grooves 609. The series of the pressure rollers 605 and 608 are adapted to press downwardly portions of the assembly 300 through the circumferential tapered projections 610 thereof to cause the same portions of the assembly 300 to be indented. By the downwardly pressing of the portions of the assembly 300 through the circumferential tapered projections of the pressure rollers 605, portions of the wadding material of the assembly 300 are protruded downwardly through the slits 51 of the support plate 50 to be then cut by the roll cutter means 70 described hereinafter.

Same as the first section 61 of the assembly advancing and pressing means 60, the second section 62 includes a plurality of shafts 611 to 616. The shafts 611 to 616 respectively extend in the direction perpendicular to the direction X and rotatably supported by the frame 40 in a manner to be arranged at regular intervals along a length of the second section 62, to each of which shafts 611 to 616 a single pressure roller provided with circumferential grooves (not shown) is secured. Each of the pressure rollers 617 to 622 mounted on the shafts 611 to 616, respectively, has a width (measured in the direction perpendicular to the sheet of FIG. 4) corresponding to that of the support plate 50. The series of the pressure rollers 617 to 622 is adapted to press the entire of the assembly 300 with the backing sheet 34 in cooperation with the guide means 110.

In the illustrated embodiment, the rotatable shafts 601 and 616 are each connected to any conventional driving means (not shown), e.g., a motor and are adapted to be synchronously rotated in a counterclockwise direction by means of the driving means, so that rotation of the shafts 601 and 616 causes rotation of the series of the pressure rollers 605 on the shaft 601 and rotation of the pressure roller 622 on the shaft 616 in the same direction, respectively.

Reference numeral 623 denotes a plurality of belts which pass around the circumferential grooved portions of the pressure rollers 605, under the circumferential grooved portions of the pressure rollers 606 to 621 and then around the circumferential grooved portions of the pressure roller 622. Through these belt 623, power transmitted to the series of the pressure rollers 605 and the pressure roller 622 from the driving means (not show) is transmitted to cause other pressure rollers to be rotated.

As described above, the initial pressure rollers 605 of the first section 61 of the assembly advancing and pressing means 60 are each located right above a portion of the length of the corresponding one of the slits 51 of the support plate 50. Correspondingly, located slightly in advance of a position right below the same portion of the length of the slit 51 of the support plate 50 is roll cutter means 70 such as, for example, a metal saw. More particularly, below the support plate 50, a plurality of the roll cutter means 70 corresponding in number to the pressure rollers 605 on the shaft 601 are located. The roll cutter means 70 are secured to a shaft 71 which extends in the direction perpendicular to the direction X to be rotatably supported by the frame 40 and connected to any conventional driving means (not shown), e.g., a motor. The shaft 71 is adapted to be rotated in a counterclockwise direction by means of the driving means synchronously with the rotation of the shaft 601 to which the series of the pressure rollers 605 is secured, so that the rotation of the shaft 71 causes rotation of the series of the roll cutter means 70 in the same direction synchronously with the rotation of the series of the pressure rollers 605. Each of the rotary cutter means 70 is provided with a circumferential blade portion having a width (measured in the direction perpendicular to the sheet of FIG. 4) slightly less than that of the corresponding slit 51 of the support plate 50, which circumferential blade portion is inserted in the corresponding slit 51 of the support plate 50 as shown in FIG. 7. Alternatively, the plurality of the roll cutter means 70 may be a single milling cutter having a width (measured in the direction perpendicular to the sheet of FIG. 4) corresponding to that of the support plate 50. In this case, a circumference blade portion of the milling cutter is slightly spaced from the support plate 50.

The backing sheet sticking roller 80 briefly stated above is rotatably supported by a shaft 81 which extends in the direction perpendicular to the direction X to be carried by the frame 40. Reference numeral 82 indicates a supply roll for the backing sheet 34 of the same width as the assembly 300 which is carried by an idler shaft 83 rotatably supported by the frame 40. Arranged slightly in rear of the supply roll 82 is a roll coater 84 having a width (measured in the direction perpendicular to the sheet of FIG. 4) slightly more than that of the backing s heet 34 and rotatably supported by a shaft 85 which is carried by the frame 40. There is a vessel 86 for adhesive 87 which is located on a floor 41 of the frame 40. The circumferential portion of the roll coater 84 is immersed in adhesive 87 in the vessel 86. The backing sheet 34 is unwound from the backward side of the roll 82 and fed upwardly, during which adhesive 87 is applied onto the entire surface of the backing sheet 34 by means of the roll coater 84, and pass over an idler roller 88, under an idler roller 89 and then around the roller 80. The roller 80 is adapted to be rotated in a clockwise direction with advancing of the assembly 300 to stick the backing sheet 34 onto the underside of the wadding material 32 of the assembly 300.

In the frame 90 for the hot-air drying unit 100, the guide means 110 briefly described above is located below the second section 62 of the assembly pressing and advancing means 60. The guide means 110 comprises a plurality of shafts 111 to 116 which respectively extend in the direction perpendicular to the direction X and rotatably supported by the frame 40 in a manner to be arranged at the same intervals as the intervals of the shafts 611 to 616 along the direction X; a plurality of guide rollers 117 to 122 which are respectively secured to the shafts 111 to 116 in a manner to be located just below the pressure rollers 617 to 622; and a single belt 123 which passes around the guide roller 117, over the small-sized guide rollers 118 to 121 and then around the guide roller 122. In the illustrated embodiment, each of the guide rollers 117 to 122 has a width (measured in the direction perpendicular to the direction X) corresponding to those of the pressure rollers 617 to 622 and the belt 123 also has a width corresponding to those of the pressure rollers 617 to 622. The guide mean 110 is adapted to be driven with advancing of the assembly 300 to guide it along the length thereon. In the illustrated embodiment, the hot-air drying unit 100 is located below the guide means 110.

Now, the manner of operation of the trim cover forming apparatus constructed as descrived above will be described hereinafter with reference to FIGS. 4 to 7.

First, a continuous strip of an assembly 300 of a covering sheet 30 and wadding material 32 previously prepared as shown in FIG. 3 is fed into the space between the support plate 50 and the series of the pressure rollers 605 of the assembly advancing and pressing means 60 and then is advanced along the support plate 50 by rotation of the series of the pressure rollers 605. At this time, as shown in FIG. 7, with the rotation of each pressure roller 605, its circumferential tapered projection 610 presses downwardly a portion of the assembly 300 right below the tapered projection 610 to cause the same portion of the assembly 300 to be indented and cause a portion of the wadding material 32 of the assembly 300 positionally corresponding to the corresponding one of the slits 51 of the support plate 50 to be protruded downwardly through the slit 51 of the support plate 50. The so-protruded portion 32a of the wadding material 32 is then cut by rotation of the corresponding roll cutter means 70. As a result, the assembly 300 becomes thin at the cut portion thereof, so that tensile strength is weakened at the same portions of the assembly 300. The assembly 300 is further advanced along the support plate 50 by the driving of the advancing and pressing means 60, during which the assembly 300 is also pressed downwardly to be dented by the circumferential tapered projections 610 of the series of the pressure rollers 606 and 607 at the same portions thereof as indented by the circumferential tapered projections 610 of the pressure rollers 605. When the assembly 300 reaches the space between the series of the pressure rollers 608 and the backing sheet sticking roller 80, the backing sheet sticking roller 80 is rotated in the clockwise direction with the further advancing of the assembly 300. Then, the backing sheet 34 which is unwound from the supply roll 82 and passes around the roller 80 is stuck onto the underside of the wadding material 32 of the assembly 300 while be pressed against the underside of the wadding material 32 with the rotation of the backing sheet sticking roller 80. At this time, the circumferential tapered projections 610 of the pressure rollers 608 press downwardly the same portions of the assembly 300 as indented by means of the circumferential tapered projections 610 of the pressure rollers 605 to 607 to cause the same portions of the assembly 300 to be dented. In this manner, the laminating of the assembly 300 with the backing sheet 34 is carried out while pressing downwardly the portions of the assembly 300 to continue to cause the same portions of the assembly 300 to be dented by means of the circumferential tapered projections 610 of the pressure rollers 608 and that pressing the backing sheet 34 against the wadding material 32 of the assembly 300 by the roller 80, so that the assembly 300 and the backing sheet 34 are strongly stuck to each other especially at the portions of the assembly 300 indented by the circumferential tapered projections 610 of the pressure rollers 608. Moreover, since the portions of the assembly 300 indented by the circumferential tapered projections 610 of the pressure rollers 608 are those thinned by the above-mentioned cutting operation and therefore tensile strength is weak at the same portions of the assembly 300 as described above, the indents still remain in the assembly 300 laminated with the backing sheet 34 even though the assembly 300 laminated with the backing sheet 34 is released from the pressing by the circumference tapered projections 610 of the pressure rollers 608 resulting in the restoring of the wadding material 32 of the assembly 300 to the original state to swell. The assembly 300 with the backing sheet 34 is then fed into the space between the guide means 110 and the second section 62 of the assembly advancing and pressing means 60 by the further driving of the assembly advancing and pressing means 60 to further advance while being pressed in its entirely by cooperation of the second section 62 and the guide means 110. During the pressing operation by the section 62 of the assembly advancing and pressing means 60 and the guide means 110, the adhesive 87 between the backing sheet 34 and wadding material 32 of the assembly 300 is dry-treated by hot-air fed from the hot-air drying unit 100. Then, the so-dried completed product is discharged from the forward ends of the second section 62 and of the guide means 110. Thus, the above-mentioned overall operation is successively carried out, whereby a continuous finished product having straight stripe-like indents P appreciatsed as ornamental patterns therein as shown in FIG. 8 is produced.

Incidentally, the continuous finished product produced as described above is thereafter cut to predetermined length to be formed into shapes suitable for seats.

In the illustrated embodiment, the application of adhesive 87 onto the backing sheet 34 is carried out, using the roll coater 84. Alternatively to the employment of the roll coater 84, a nozzle which is adapted to spray adhesive onto the backing sheet 34 may be employed.

Further, in the illustrated embodiment, there are the small-size pressure rollers 606 and 607 between the pressure rollers 605 and 608. These pressure rollers 606 and 607 may be omitted.

Figure 9:
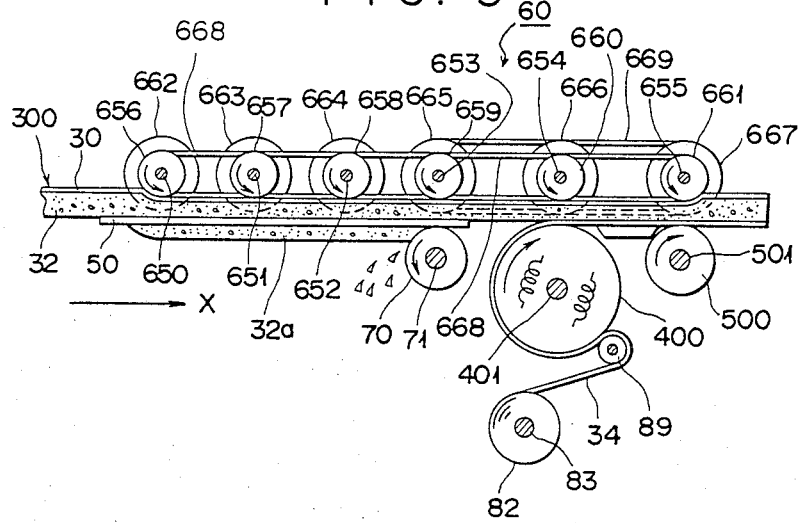
FIG. 9 is a schematic side view of a second embodiment of an apparatus for performing a method of the present invention for making trim cover.
Figure 10:
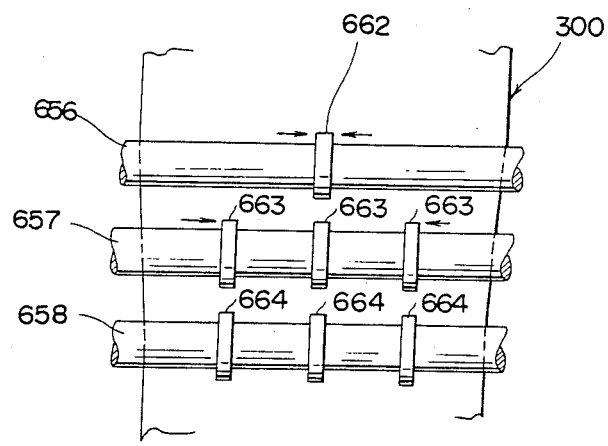
FIG. 10 is a fragmentary plan view and showing a part of the trim cover forming apparatus shown in FIG. 9.
Figure 12:
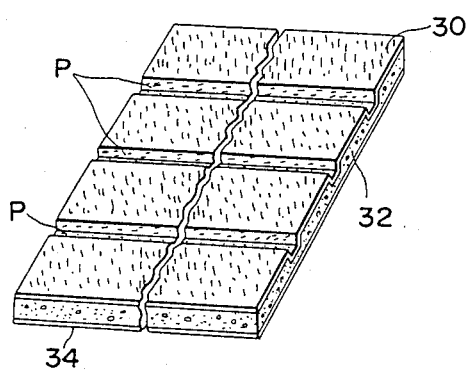
FIG. 12 is a schematic perspective view showing a finished product produced by the trim cover forming apparatus shown in FIG. 9, wherein the finished product is cut short.

FIGS. 9 and 10 illustrate an apparatus for forming trim cover according to a second embodiment of this invention, which is adapted to form trim cover having a plurality of straight line-like indents P of predetermined widths appreciated as ornamental patterns therein as shown in FIG. 12.

Same as the trim cover forming apparatus shown in FIGS. 4 and 5, the trim cover forming apparatus of FIGS. 9 and 10 generally includes a frame (not shown), a horizontal support plate 50 carried by the frame for receiving and supporting thereon a continuous strip of an assembly 300 of a covering sheet 30 and wadding material 32 of FIG. 3 which is fed, with the wadding material portion being turned downward, to the trim cover forming apparatus, roll cutter means 70 located below the support plate 50, and means 60 extending horizontally from a position above the support plate 50 in an advancing direction X of the assembly 300 and for advancing the assembly 300 while pressing it. The trim cover forming apparatus also includes a heat-pressing roller 400 which is located below a portion of the assembly advancing and pressing means 60 and next to the support plate 50, and a pinch roller 500 which is located below the forward end portion of the assembly advancing and pressing means 60 and next to the heat-pressing roller 400. The heat-pressing roller 400 serves to stick a backing sheet 34 having the same width as that of the assembly 300 onto the underside of the wadding material 32 of the assembly 300.

In this illustrated embodiment, the support plate 50 has a width (measured in a direction perpendicular to a sheet of FIG. 9) slightly more than that of the assembly 300 and is formed with three linear slits 51 (see FIG. 11B) which respectively extend along a longitudinal direction of the support plate 50 and are arranged at regular intervals along the width direction of the support plate 50. The heat-pressing roller 400 has a width (measured in the direction perpendicular to the sheet of FIG. 9) corresponding to that of the support plate 50. Also, the pinch roller 500 has a width (measured in the direction perpendicular to the sheet of FIG. 9) corresponding to that of the support plate 50.

The assembly advancing and pressing means 60 briefly stated above comprises a plurality of shafts 650 to 655 which respectively extend in the direction perpendicular to the sheet of FIG. 9 and are rotatably supported by the frame (not shown) in a manner to be arranged at intervals in the direction X, and a plurality of pressure rollers 656 to 661 which are secured to the shafts 650 to 655, respectively. Of the shafts 650 to 655, the shafts 654 and 655 are located right above a shaft 401 for the heat-pressing roller 400 and right above a shaft 501 forthe pinch roller 500, respectively. Therefore, the pressure roller 660 on the shaft 654 and the pressure roller 661 on the shaft 655 are located right above the heat-pressing roller 400 and right above the pinch roller 500, respectively. Each of the pressure rollers 656 to 661 has a width (measured in the direction perpendicular to the sheet of FIG. 9) corresponding to that of the support plate 50. As shown in FIG. 10, of the pressure rollers 656 to 658, the pressure roller 656 on the shaft 650 is provided with a belt-like circumferential projection 662 which is located above a portion of the length of the central one of the three linear slits 51 of the support plate 50, while the pressure roller 657 on the shaft 651, and the pressure roller 658 on the shaft 652 are provided with three circumferential projections 663 and 664, respectively. The three circumferential projections of each of the pressure rollers 657 and 658 are located right above portions of the lengths of the three linear slits 51 of the support plate 50, respectively. Also, the pressure roller 659 on the shaft 653, the pressure roller 660 on the shaft 654 and the pressure roller 661 on the shaft 655 are provided with three circumferential projections 665, 666 and 667, respectively (see FIG. 9). The three circumferential projections 665 of the pressure roller 659 are located right above portions of the lengths of the three linear slits 51 of the support plate 50, respectively. Also, the three circumferential projections of each of the pressure rollers 660 and 661 are each located right above a position on a horizontal extension line from the length of any one of the three linear slits 51 of the support plate 50. Each of the circumferential projections 662 to 667 has a predetermined width (measured in the direction perpendicular to the sheet of FIG. 9) slightly less than that of the slit 51 of the support plate 50.

In the illustrated second embodiment, the rotatable shafts 650 and 655 are each connected to any conventional driving means (not shown), e.g., a motor and are adapted to be synchronously rotated in a counterclockwise direction by the driving means, so that rotation of the shafts 650 and of the shaft 655 causes rotation of the pressure roller 656 on the shaft 650 and of the pressure roller 661 on the shaft 655, respectively. Reference numeral 668 denotes a pair of belts (only one is shown in FIG. 9) each of which passes around the pressure roller 656, under the pressure rollers 657 to 660 and then around the pressure roller 661. Also, reference numeral 669 denotes a belt which passes around one of the three circumferential projections 665 of the pressure roller 659, under one of the three circumferential projections 666 of the pressure roller 660, and then around one of the three circumferential projections 667 of the pressure roller 661. Through these belts 668 and 669, power transmitted to the pressure rollers 656 and 661 from the driving means (not shown) is transmitted to cause other pressure rollers to be rotated.

The roll cutter means 70 briefly described above is, for example, a single milling cutter having a width (measured in the direction perpendicular to the sheet of FIG. 9) corresponding to that of the support plate 50. The roll cutter means 70 is secured to a shaft 71 which extends in the direction perpendicular to the sheet of FIG. 9 and rotatably supported by the frame (not shown) in a manner to be located below the forward terminal ends of the three slits 51 of the support plate 50. The roll cutter means 70 is adapted to be rotated in a counterclockwise synchronously with the rotation of the pressure roller 659 by a motor (not shown) which is connected to the shaft 71.

Located below the heat-pressing roller 400 is a supply roll 82 for a backing sheet 34 of the same width as the assembly 300 which is carried by an idler shaft 83 rotatably supported by the frame (not shown). On the surface ofthe backing sheet 34, hot-melt adhesive is previously applied. The hot-melt adhesive may be of nonwoven fabric type or of powder type. The backing sheet 34 is unwound from the backward sign of the supply roll 82 and fed upwardly and passes under an idler roller 89 and then around the hot-pressing roller 400. Thus, the backing sheet 34 is stuck to the underside of the assembly 300. At this time, hot-melt adhesive on the backing sheet 34 is melted by the hot-pressing roller 400.

Now, the manner of operation of the trim cover forming apparatus of FIGS. 9 and 10 will be described hereinafter with reference to FIGS. 9 to 11.

Figure 11A:
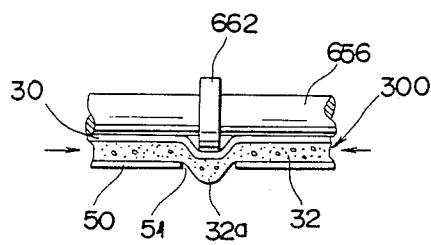
FIGS. 11A and 11B are each a fragmentary front view and of assistance in explaining a step of pressing downwardly wadding material with a sheet of covering material by pressure means incorporated in the trim cover forming apparatus shown in FIG. 9.
Figure 11B:
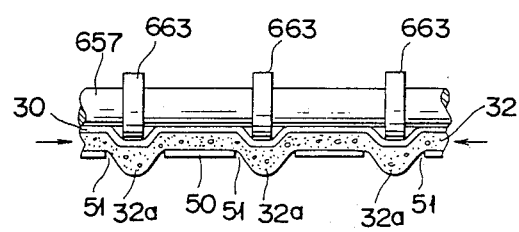

First, a continuous strip of an assembly 300 of a covering sheet 30 and wadding material 32 previously prepared as shown in FIG. 3 is fed into a space between the support plate 50 and the pressure roller 656 and then advanced along the support plate 50 by rotation of the pressure roller 656. At this time, as shown in FIGS. 10 and 11A, firstly the assembly 300 is pressed downwardly to be dented at a substantially central portion of the width thereof while being gathered toward the central portion from the both sides thereof by the projection 662 of the pressure roller 656 which has been rotated. Thus, a portion of the wadding material 32 of the assembly 300 positionally corresponding to the central one of the slits 51 of the support plate 50 is protruded downwardly through the central one of the slits 51 of the support plate 50 by the rotation of the circumferential projection 662. The assembly 300 is further advanced along the support plate 50 by the driving of the advancing and pressing means 60 to be led into a space between the pressure roller 657 and the support plate 50. At this stage, the assembly 300 is pressed downwardly to be dented at three portions of the width thereof while being gathered toward the central portion of the width from the both sides thereof by the three circumferential projections 663 of the pressure roller 657 which have been rotated, as shown in FIGS. 10 and 11B. As a result, portions of the wadding material 32 of the assembly 300 positionally corresponding to the three slits 51 of the support plate 50 are protruded downwardly through the slits 51 of the support plate 50 by the rotation of the three circumferential projections 663. The assembly 300 is further advanced along the support plate 50 to be treated by the circumferential projections 664 of the pressure roller 658 and the circumferential projections 665 of the pressure roller 659 in the same manner as has been done by the three circumferential projections 663 of the pressure roller 657. As described above, firstly, the single circumferential projection 662 of the pressure roller 656 presses downwardly the substantially central portion of the width of the assembly 300 to cause the same portion of the assembly 300 to be indented while gathering the assembly 300 from its both sides toward the central portion of the width as shown in FIGS. 10 and 11A and, secondly, the three circumferential projections 663 to 665 of the pressure roller 657 to 659 press downwardly the portions of the assembly 300 to cause the same portions of the assembly 300 to be indented while gathering the assembly 300 from its both sides toward the central portion of the width as shown in FIGS. 10 and 11B. By this manner, it is possible to make continuous indent patterns in the assembly 300 without applying excessive pressure to the assembly 300 at a stretch. Thus, the portions 32a of the wadding material 32 of the assembly 300 protruded downwardly through the slits 51 of the support plate 50 by the projections 662 to 665 of the pressure rollers 656 to 659 are cut by rotation of the roll cutter means 70. The assembly 300 is further advanced by the driving of the assembly advancing and pressing means 60 to be guided into a space between the pressure roller 660 and the heat-pressing roller 400. Then, the heat-pressing roller 400 sticks the backing sheet 34 onto the underside of the wadding material 32 of the assembly 300 while being rotated with the advancing of the assembly 300 and melting hot-melt adhesive on the backing sheet 34. The sticking operation of the backing sheet 34 to the wadding material 32 of the assembly 300 is carried out while pressing the assembly 300 and the backing sheet 34 by the pressure roller 660, the circumferential projections 666 of the pressure roller 660 and the heat-pressing roller 400. Therefore, the entire of the assembly 300 including the portions having been indented by the circumferential projections 666 of the pressure roller 660 and the backing sheet 34 are strongly stuck to each other. Thereafter, the completed assembly is further advanced to be guided into a space between the pressure roller 661 and the pinch roller 500, and is then pressed in its entirety again by the pressure roller 661, the circumferential projections 667 of the pressure roller 661 and the pinch roller 500. Then, the completed assembly is discharged from the apparatus. Thus, the above-mentioned overall operation is successively carried out, whereby a continuous finished product having straight line-like indents P of predetermined widths appreciated as ornamental patterns as shown in FIG. 12 is produced.

Figure 13:
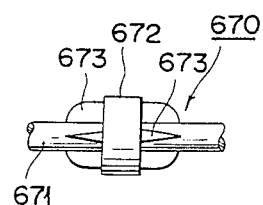
FIG. 13 is a fragmentary front view showing a modification of a pressure roll used in the trim cover forming apparatus shown in FIG. 4 and/or FIG. 9.
Figure 14:
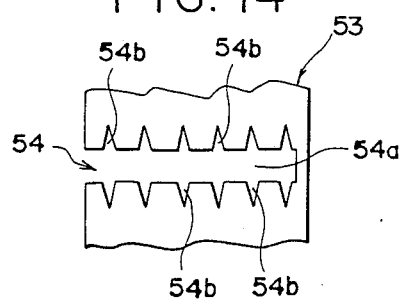
FIG. 14 is a fragmentary plan view showing a modification of the support means shown in FIG. 6 and used together with the pressure roller shown in FIG. 13.
Figure 15:
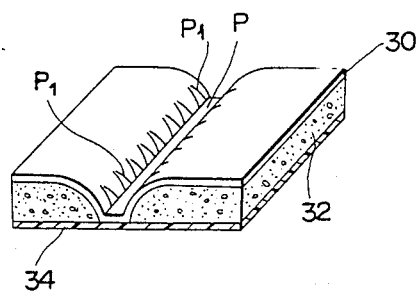
FIG. 15 is a schematic perspective view showing a finished product produced by the trim cover forming apparatus having the pressure roll of FIG. 13 and the support means of FIG. 14 incorporated therein.

In the first and second embodiments, alternatively to the employment of each of the combinations of the shafts and pressure rollers constituting the assembly advancing and pressing means 60, pressure roll means 670 as shown in FIG. 13 may be employed. In the case where the pressure roll means 670 is employed, correspondingly a support plate 53 as shown in FIG. 14 is employed in place of the support plate 50. By using a series of the pressure roll means 670 and the support plate 53, a trim cover as shown in FIG. 15 is produced, which trim cover has a channel P with gathers P1 along the length of the both margins of the channel P appreciated as ornamental patterns therein.

The pressure roll means 670 comprises a rotary shaft 671, a roll portion 672 integrally formed on the rotary shaft 671, and two series of blade-shaped teeth 673 which are integrally formed around the shaft 671 in a manner to the roll portion 672 therebetween. The support plate 53 is provided with a hole 54 which consists of a linear portion 54a extending along a longitudinal direction of the support plate 53 and a plurality of substantially V-shaped portions 54b arranged along the lengths of the both margins of the linear portion 54a. The shape of the hole 54 of the support plate 53 substantially corresponds to that of an ornamental pattern made in the assembly 300 of FIG. 3 by the pressure roll means 670. The linear portion 54a of the hole 54 corresponds to the roll portion 672 of the pressure roll means 670 and the substantially V-shaped portions 54b between which the linear portion 54a is interposed correspond to the blade-shaped teeth 673 between which the roll portion 672 of the pressure rollmeans 670 is interposed. The pressure roll means 670 constructed as described above is located above the support plate 53 in a manner such that the roll portion 672 is in alignment with the linear portion 54a of the hole 54 of the support plate 53 and the blade-shaped teeth 673 between which the roll portion 672 is interposed is in alignment with the V-shaped portions 54b between which the linear portion 54a of the hole 54 is interposed.

In the case where the support plate 53 and the pressure roll means 670 constructed as described above are employed in a pair, an assembly 300 (FIG. 3) previously cut to predetermined length is fed, in a state of the wadding material portion 32 thereof being turned downward, into a space between the support plate 53 and the pressure roll means 670, and then advanced along the support plate 53 by the rotation of the shaft 671 of the pressure roll means 670. At this time, with the rotation of the shaft 671, the roll portion 672 presses downwardly a portion of the assembly 300 right below the roll portion 672 to cause the same portion of the assembly 300 to be indented and simultaneously the blade shaped teeth 673 presses downwardly the assembly 300 to make gathers at the both margins of the portion indented by the roll portion 672. The downwardly pressing of the assembly 300 by the pressure roll means 670 causes a portion of the wadding material 32 of the assembly 300 positionally corresponding to the hole 54 of the support plate 53 to be protruded downwardly through the hole 54 of the support plate 53. Then, the so-protruded portion of the wadding material 32 is cut by the cutter means 70. Thereafter, the assembly 300 is treated in the same manner as done in the first and second embodiments. Thus, the finished product shown in FIG. 15 is produced.

Figure 16:
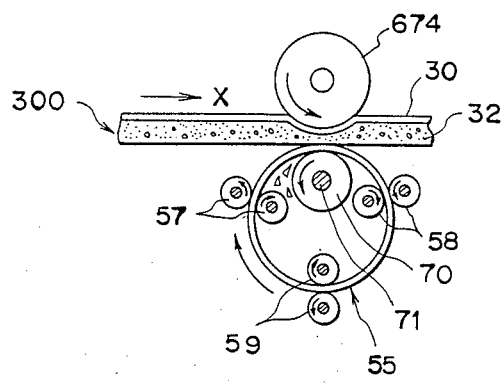
FIG. 16 is a schematic side view showing a further modification of the pressure roller shown in FIG. 13 and a further modification of the support means shown in FIG. 14 which are used together with each other.
Figure 19:
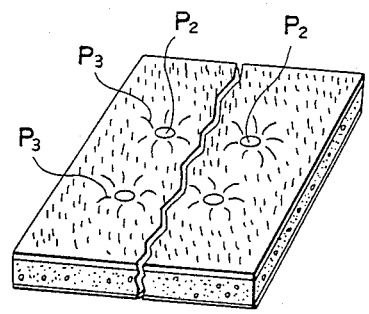
FIG. 19 is a schematic perspective view showing a finished product produced by the trim cover forming apparatus having the pressure roller of and the support means of FIG. 16 incorporated therein, wherein the finished product is cut short.

The above-mentioned description is made of the trim cover forming apparatus which is adapted to form trim cover having straight line patterns therein. The application of the present invention is not limited to such apparatus and the present invention may be applied to a trim cover forming apparatus which is adapted to form trim cover having recess patterns P2 for, for example, hanging buttons and wrinkle patterns P3 radially made around each of the recesses patterns P2 as shown in FIG. 19. In case of forming trim cover which has ornamental patterns P2 and P3 therein as shown in FIG. 19, a pressure roller 674 shown in FIG. 16 is employed in place of each of the pressure rollers constituting the assembly advancing and pressing means 60 of the first and second embodiments, and correspondingly, drum-like support means 55 shown in FIG. 16 is employed in place of the support plate 50 in the first and second embodiments.

Figure 17:
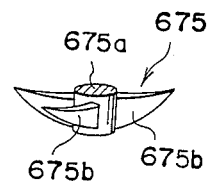
FIG. 17 is a fragmentary perspective view of a projection provided on the pressure roller shown in FIG. 16.

The pressure roller 674 has a width (measured in a direction perpendicular to a sheet of FIG. 16) more than that of the assembly 300 and is provided with a plurality of substantially anchor-shaped projections 675 (only one is shown in FIG. 17) on a circumferential surface thereof. The substantially anchor-shaped projections 675 each consist of a post 675a radially extending from the circumferential surface of the body of the pressure roller 674, and a plurality of teeth 675b radially protruding from the tip end portion of the post 675a.

Figure 18:
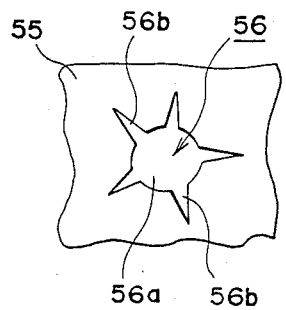
FIG. 18 is a fragmentary plan view of the support means shown in FIG. 16.

The drum-like support means 55 which is employed in place of the support plate 50 has a width (measured in the direction perpendicular to the sheet of FIG. 16) corresponding to that of the pressure roller 674 and is provided with a plurality of substantially star-shaped perforations 56 (only one is shown in FIG. 18) which are formed at the circumferential wall of the drum 55. The substantially star-shaped perforations 56 each consist of a substantially circular portion 56a and a plurality of substantially inverted V-shaped portions 56b extending from the circular portion 56a in a radial manner. The drum 55 is rotatably supported by three pairs of pinch rolls 57 to 59 in a manner to be located below the pressure roller 674, each of which pinch rolls 57 to 59 is rotatably carried by a frame (not shown). As shown in FIG. 16, the assembly 300 is fed into a space between the pressure roller 674 and the drum 55 and then advanced in a direction X with counterclockwise rotation of the pressure roller 674. Simultaneously with the advancing of the assembly 300, the drum 55 is adapted to be rotated in a clockwise direction. When any one of the substantially anchor-shaped projections 675 on the circumferential surface of the pressure roller 674 reaches the bottom of the rotation of the pressure roller 674 with the rotation of the pressure roller 674, synchronously any one of the substantially star-shaped perforations 56 of the drum 55 is adapted to reach the top of the rotation of the drum 55 with the rotation of the drum 55, resulting in the substantially anchor-shaped projection 675 and the substantially star-shaped perforation 56 becoming opposite to each other. Thus, when the anchor-shaped projection 675 on the pressure roller 674 and the star-shaped perforation 56 of the drum 55 are opposited to each other, the assembly 300 between the pressure roller 674 and the drum 55 is pressed downwardly at a portion thereof right below the anchor-shaped projection 675 by the anchor-shaped projection 675 to be indented. At this time, a portion of the wadding material 32 of the assembly 300 positionally corresponding to the star-shaped perforation 56 is protruded into the drum 55 through the star-shaped perforation 56 of the drum 55. The protruded portion of the wadding material 32 of the assembly 300 is then cut by a roll cutter 70 located within the drum 55 so as not to hinder from the rotation of the drum 55. The roll cutter 70 has a width (measured in the direction perpendicular to the sheet of FIG. 16) slightly less than that of the drum 55 and is secured to a rotatable shaft 71 which is rotatably supported by the frame (not shown) and connected to a motor (not shown). The shaft 71 is adapted to be rotated in a counterclockwise direction by the motor, so that rotation of the shaft 71 causes rotation of the roll cutter 70 in the same direction. The roll cutter 70 is adapted to be rotated synchronously with rotation of the pressure roller 674. Thus, the assembly 300 which is cut by the roll cutter 70 at the portion of the wadding material 32 thereof while being pressed downwardly by the anchor-shaped projection 675 of the pressure roller 674 is then treated in the same manner as done in the first and second embodiments.

Figure 20:
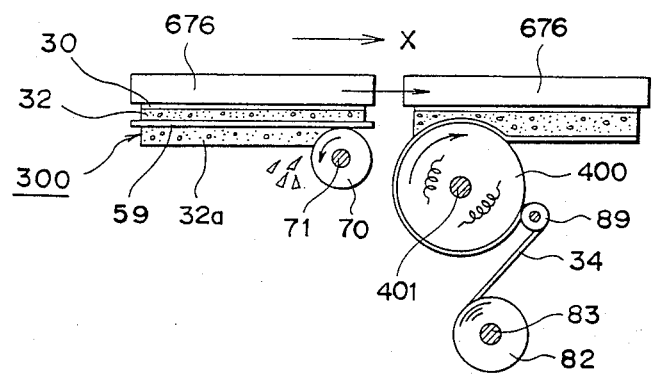
FIG. 20 is a schematic side view showing a third embodiment of an apparatus for performing a method of the present invention for making trim cover.
Figure 21:
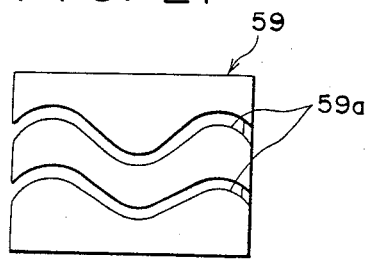
FIG. 21 is a schematic plan view of support means incorporated in the trim cover forming apparatus shown in FIG. 20.

FIGS. 20 and 21 show a third embodiment of the present invention.

Figure 22:
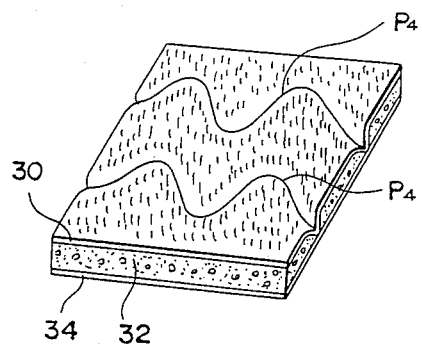
FIG. 22 is a schematic perspective view of a finished product produced by the trim cover forming apparatus shown in FIG. 20.

An apparatus for forming trim cover according to the third embodiment of this invention is adapted to form trim cover having a plurality of meandrous stripe-like indents P4 appreciated as ornamental patterns therein as shown in FIG. 22. The trim cover forming apparatus comprises plate-like pressure means 676 and a support plate 59 located below the plate-like pressure means 676. The support plate 59 is provided with a plurality of meandrous line-like slits 59a and, correspondingly, the plate-like pressure means 676 is provided with a plurality of meandrous line-like tapered projections (not shown) which are formed on the underside of the plate-like pressure means 676 in a manner to align with the meandrous line-like slits 59a of the support plate 59, respectively. In this illustrated embodiment, a precut assembly 300 of a covering sheet 30 and wadding material 32 is adapted to be fed, in a state of the wadding material side thereof being turned downward, into a space between the plate-like pressure means 676 and the support plate 59 and is then pressed against the support plate 59 by the plate-like pressure means 676. At this time, the meandrous line-like tapered projections formed on the underside of the plate-like pressure means 676 indents portions of the assembly 300 right below itself to cause portions of the wadding material 32 of the assembly 300 corresponding to the meandrous line-like slits 59a of the support plate 59 to be protruded downwardly from the support plate 59 through the meandrous line-like slits 59a of the support plate 59. Then, the assembly 300 is fed by the pressure means 676, while being still pressed against the support plate 59 by the pressure means 676 and sliding along the support plate 59, to a heat-pressing roller 400 for sticking a sheet 34 of backing material onto the underside of the assembly 300. During the advancing of the assembly 300, the portions of the wadding material 32 of the assembly 300 having been protruded downwardly by the meandrous line-like tapered projections of the pressure means 676 are cut by a roll cutter 70 which is located below the support plate 59 and secured to a shaft 71 which extends in a direction perpendicular to a sheet of FIG. 20 to be connected to a motor (not shown). Alternatively, the cutting operation may be completed before the assembly 300 is fed to the heat-pressing roller 400. Such cutting operation prior to the advancement of the assembly 300 may be performed by moving rearwards the roll cutter 70 while causing it to be rotated. Such movement of the roll cutter 70 may be carried out, for example, by constructing in a manner such that the motor to which the shaft 71 of the roll cutter 70 is connected is mounted on, for example, a rod of a reciprocating drive cylinder (not shown) which is adapted to reciprocate in a horizontal direction. As described above, the assembly 300 is advanced by the pressure means 676 while being still pressed against the support plate 59 by the pressure means 676 and sliding along the support plate 59. For this purpose, the pressure means 676 may be constructed in a manner to be connected, for example, to a rod of a reciprocating drive cylinder (not shown). More particularly, the reciprocating drive cylinder may be slidably supported through any conventional slidable means by a ceiling of a frame (not shown) in a manner to hang from the ceiling and slide in a direction X. Onto the upper surface of a body of the pressure means 676, the end of the rod of the reciprocating drive cylinder may be connected. Such construction may allow the pressure means 676 to carry out the predetermined operation. More particularly, when the reciprocating drive cylinder is actuated, the pressure means 676 is moved downwardly to press the assembly 300 against the support plate 59 and when the reciprocating drive cylinder receives a command to slide in the direction X, the pressure means 676 is moved to the same direction while still pressing the assembly 300 against the support plate 59 due to the actuation of the drive cylinder and causing the assembly 300 to slide on the support plate 59 due to the horizontal movement of the drive cylinder. Then, the assembly 300 may be fed to the heat-pressing roller 400. Thereafter, the assembly is treated in the same manner as done in the second embodiment. Thus, a completed product having meandrous stripe-like indents P4 appreciated as ornamental patterns therein as shown in FIG. 22 is produced.

Figure 23:
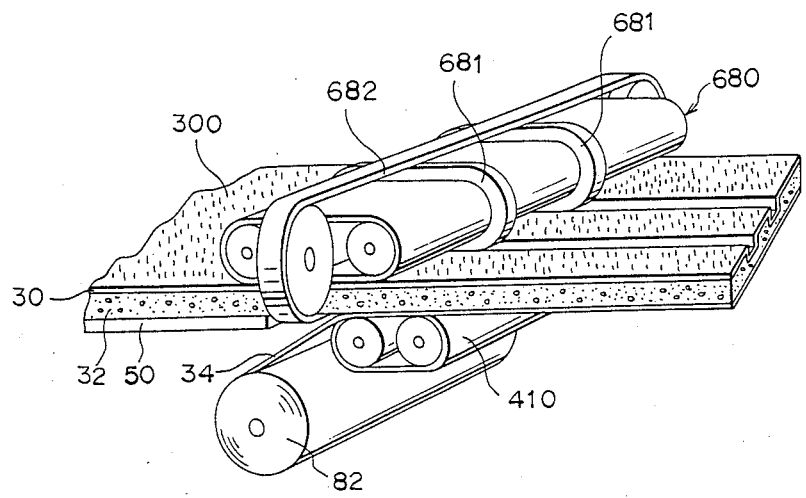
FIG. 23 is a schematic perspective view of a fourth embodiment of an apparatus for performing a method of the present invention for forming trim cover.

FIG. 23 shows an apparatus for forming trim cover according to a fourth embodiment of this invention.

In the fourth embodiment of FIG. 23, a support plate 50 is identical to that shown in FIG. 6 (but, in the fourth embodiment, the support plate 50 has two linear slits) and a supply roll 82 for a backing sheet is identical to that shown in FIG. 4. Therefore, the description of them will not be repeated.

Figure 24A:
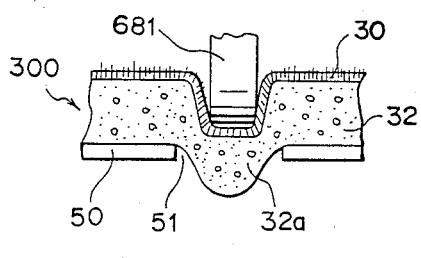
FIGS. 24A, 24B and 24C each show one of steps of a method of forming trim cover performed by the trim cover forming apparatus of FIG. 23.
Figure 24B:
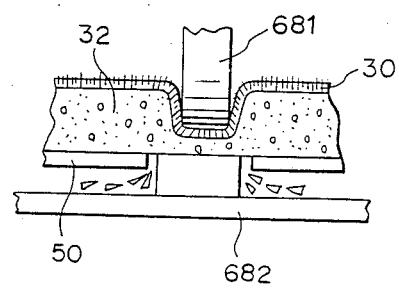
Figure 24C:
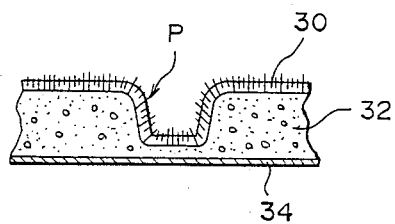

Referring now to FIG. 23, a guide roller 680 is located in a manner to be laid from a position above a portion of the support plate 50 near the terminal end of the support plate 50 to a position above a backing sheet sticking roller 410. The guide roller 680 is provided with circumferential projections 681 which are formed on the circumferential surface of the guide roller 680 in a manner to align with the linear slits 51 of the support plate 50. The assembly 300 is fed into a space between the guide roller 680 and support plate 50 and is then pressed against the support plate 50 by the circumferential projections 681 at portions thereof just below the circumferential projections 681 to be indented. At this time, portions of the wadding material 32 of the assembly 300 positionally corresponding to the slits 51 (only one is shown in FIG. 24A) of the support plate 50 are protruded downwardly from the support plate 50 through the slits 51 of the support plate 50 as shown in FIG. 24A. Then, the protruded portions 32a (only one is shown in FIG. 24A) of the wadding material 32 are cut by a band cutter 682 at a position slightly in advance of the terminal end of the support plate 50, while being still pressed downwardly by the circumferential projections 681 of the guide roller 680 as shown in FIG. 24B. Simultaneously with the cutting of the portions 32a of the wadding material 32, an electric current is applied to the band cutter 682 and the band cutter 682 melts the cut portion of the wadding material 32 for trimming purpose, using heat generated due to the electric current. The assembly 300 which is cut-treated is fed onto the backing sheet sticking roller 410 while being still pressed at the same portions thereof by the circumferential projections 681 of the guide roller 680. Then, the assembly 300 is laminated with the backing sheet 34 while being still indented at the same portions thereof by the projections 681. Thus, a finished product having indents P appreciated as ornamental patterns therein as shown in FIGS. 23 and 24C is produced.

As described above, in the method and apparatus for forming trim cover according to the present invention, an assembly of a covering sheet and wadding material is cut to be thin at a portion thereof in which a dent appreciated as an ornamental pattern is to be made, and is then secured to a sheet of backing material while being pressed to be dented at the thinned portion thereof. Thus, it will be noted that the method and apparatus for forming trim cover according to the present invention can easily and efficiently make trim cover. Also, it will be noted that the method and apparatus for forming trim cover according to the present invention can make a finished product of fine appearance.

It will thus be seen that the objects set forth above, and those made apparent from the preceding description, are efficiently attained and, since certain changes may be made in the above construction without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A method of forming trim cover, comprising the steps of:
    a. feeding an assembly of a sheet of covering material and wadding material, with a covering material side of said assembly facing upward, onto support means for receiving and supporting said assembly thereon, said support means being provided with at least one hole of a desired predetermined shape;
    b. pressing downwardly a portion of said assembly substantially positionally corresponding to said at least one hole of said support means to cause the same portion of said assembly to be dented and a portion of said wadding material of said assembly positionally corresponding to said at least one hole of said support means to be protruded downwardly from said support means through said at least one hole of said support means;
    c. cutting said downwardly protruded portion of said wadding material of said assembly, while still pressing downwardly the same portion of said assembly to further cause the same portion of said assembly to be dented;
    d. advancing said assembly to a backing sheet laminating station; and
    e. sticking a sheet of backing material onto the wadding material side of said assembly by means of backing sheet sticking means, while pressing against said backing sheet sticking means the same portion of said assembly to continue to cause the same portion of said assembly to be dented, whereby a finished product having at least one indent of a predetermined shape appreciated as an ornamental pattern therein may be produced.

2. A method of forming trim cover as defined in claim 1, wherein said step (a) further comprises the step of feeding said assembly into a space between said support means and pressure means extending from a position above said support means to a position above said backing sheet sticking means, said pressure means including at least two pressure rollers being in corotating relation, each of which is provided with a circumferential projection, one of which pressure rollers is located above said support means, and the other of which pressure rollers is located above said backing sheet sticking means; said pressing of the portion of said assembly in said steps (b) and (c) is carried out through said circumferential projection of said one of said at least two pressure rollers; and said pressing of the portion of said assembly in said step (e) is carried out through said circumferential projection of said the other of said at least two pressure rollers.

3. A method of forming trim cover as defined in claim 1, wherein said support means is provided with at least one straight slit-like hole; said step (a) further comprises the step of feeding said assembly into a space between said support means and pressure means extending from a position above said support means to a position above said backing sheet sticking means, said pressure means including at least two pressure rollers being in corotating relation, each of which is provided with a circumferential tapered projection, one of which pressure rollers is located above said support means, and the other of which pressure rollers is located above said backing sheet sticking means; said pressing of the portion of said assembly in said steps (b) and (c) is carried out through said circumferential tapered projection of said one of said at least two pressure rollers; and said pressing of the portion of said assembly in said step (e) is carried out through said circumferential tapered projection of said the other of said at least two pressure rollers, whereby a finished product having at least one straight stripe-like indent appreciated as an ornamental pattern therein may be produced.

4. A method of forming trim cover as defined in claim 1, further comprising the step of applying adhesive onto said backing sheet prior to sticking of said backing sheet onto said wadding material side of said assembly.

5. A method of forming trim cover as defined in claim 4, further comprising the step of drying said assembly laminated with said backing sheet after said assembly is laminated with said backing sheet.

6. A method of forming trim cover as defined in claim 4, further comprising the step of pressing said assembly laminated with said backing sheet in its entirety after said assembly is laminated with said backing sheet.

7. A method of forming trim cover as defined in claim 4, further comprising the step of drying said assembly laminated with said backing sheet while pressing it as a whole after said assembly is laminated with said backing sheet.

8. A method of forming trim cover, comprising the steps of;
    a. feeding an assembly of a sheet of covering material and wadding material, with the covering material side of said assembly facing upward, onto support means for receiving and supporting said assembly thereon, said support means being provided with at least one straight slit-like hole;
    b. pressing downwardly a portion of said assembly substantially positionally corresponding to said at least one straight slit-like hole of said support means to cause the same portion of said assembly to be dented and a portion of said wadding material of said assembly positionally corresponding to said at least one straight slit-like hole of said support means to be protruded downwardly from said support means through said at least one straight slit-like hole of said support means;

c. cutting said downwardly protruded portion of said wadding material of said assembly, while still pressing downwardly the same portion of said assembly to further cause the same portion of said assembly to be dented;

d. advancing said assembly to a backing sheet laminating station; and e. sticking a sheet of backing material onto the wadding material side of said assembly by means of backing sheet sticking means, while pressing against said backing sheet sticking means the same portion of said assembly to continue to cause the same portion of said assembly to be dented, whereby a finished product having at least one straight channel-like indent appreciated as an ornamental pattern therein may be produced.

9. A method of forming trim cover as defined in claim 8, wherein said step (a) further comprises the step of feeding said assembly into a space between said support means and pressure means extending from a position above said support means to a position above said backing sheet sticking means, said pressure means including at least two pressure rollers being in corotating relation, each of which is provided with a circumferential belt-like projection, one of which pressure rollers is located above said support means, and the other of which pressure rollers is located above said backing sheet sticking means; said pressing of the portion of said assembly in said steps (b) and (c) is carried out through said circumferential projection of said one of said at least two pressure rollers; and said pressing of the portion of said assembly in said step (e) is carried out through said circumferential projection of said the other of said at least two pressure rollers.

10. A method of forming trim cover, comprising the steps of:

a. feeding an assembly of a sheet of covering material and wadding material, with a covering material side of said assembly facing upward, onto support means for receiving and supporting said assembly thereon, said support means being provided with at least one meandrous slit-like hole;

b. pressing downwardly a portion of said assembly substantially positionally corresponding to said at least one meandrous slit-like hole of said support means to cause the same portion of said assembly to be dented and a portion of said wadding material of said assembly positionally corresponding to said at least one meandrous slit-like hole of said support means to be protruded downwardly from said support means through said at least one meandrous slit-like hole of said support means;

c. cutting said downwardly protruded portion of said wadding material of said assembly, while still pressing downwardly the same portion of said assembly to further cause the same portion of said assembly to be dented;

d. advancing said assembly to a backing sheet laminating station; and e. sticking a sheet of backing material onto the wadding material side of said assembly by means of backing sheet sticking means, while pressing against said backing sheet sticking means the same portion of said assembly to continue to cause the same portion of said assembly to be dented, whereby a finished product having at least one meandrous stripe-like indent appreciated as an ornamental pattern therein may be produced.

11. A method of forming trim cover as defined in claim 10, wherein said step (a) further comprises the step of feeding said assembly into a space between said support means and plate-like pressure means being located above said support means and adapted to slide said assembly to said backing sheet sticking means while pressing said assembly against said support means, which plate-like pressure means is provided on the underside thereof with a meandrous line-like tapered projection corresponding to said at least one meandrous slit-like hole of said support means; and said pressing of the portion of said assembly in said step (b), (c) and (e) is carried out through said meandrous line-like tapered projection of said plate-like pressure means.

12. A method of forming trim cover, comprising the steps of:

a. feeding an assembly of a sheet of covering material and wadding material, with the covering material side of said assembly facing upward, onto support means for receiving and supporting said assembly thereon, said support means being provided with at least one hole which consists of an elongated straight portion and a plurality of substantially V-shaped portions arranged along both margins of said elongated portion along an axis of elongation thereof;

b. pressing downwardly a portion of said assembly substantially positionally corresponding to said at least one hole of said support means to cause the same portion of said assembly to be dented and a portion of said wadding material of said assembly positionally corresponding to said at least one hole of said support means to be protruded downwardly from said support means through said at least one hole of said support means;

c. cutting said downwardly protruded portion of said wadding material of said assembly, while still pressing downwardly the same portion of said assembly to further cause the same portion of said assembly to be dented;

d. advancing said assembly to a backing sheet laminating station; and e. sticking a sheet of backing material onto the wadding material side of said assembly by means of backing sheet sticking means, while pressing against said backing sheet sticking means the same portion of said assembly to continue to cause the same portion of said assembly to be dented, whereby a finished product having at least one indent, which consists of a straight channel portion and gathers along the lengths of both margins of said channel, appreciated as an ornamental pattern therein may be produced.

13. A method of forming trim cover as defined in claim 12, wherein said step (a) further comprises the step of feeding said assembly into a space between said support means and pressure means extending from a position above said support means to a position above said backing sheet sticking means, said pressure means including at least two pressure rollers being in corotating relation, each of which comprises a rotatable shaft, a roll portion on said rotatable shaft corresponding to said straight slit portion of said at least one hole of said support means and two series of teeth being arranged around said rotatable shaft in a manner to interpose said roll portion therebetween and corresponding to said substantially V-shaped portions of said at least one hole of said support means, one of which pressure rollers is located above said support means, and the other of which pressure rollers is located above said backing sheet sticking means; said pressing of the portion of said assembly in said steps (b) and (c) is carried out through said roll portion of and said teeth of said one of said at least two pressure rollers; and said pressing of the portion of said assembly in said step (e) is carried out through said roll portion of and said teeth of said the other of said at least two pressure rollers.

14. A method of forming trim cover, comprising the steps of:
   a. feeding an assembly of a sheet of covering material and wadding material, with the covering material side of said assembly facing upward, onto support means for receiving and supporting said assembly thereon, said support means being provided with at least one substantially star-like hole which consists of a circular portion and a plurality of substantially inverted V-shaped portions arranged along a circumference of said circular portion;
   b. pressing downwardly a portion of said assembly substantially positionally corresponding to said at least one hole of said support means to cause the same portion of said assembly to be dented and a portion of said wadding material of said assembly positionally corresponding to said at least one hole of said support means to be protruded downwardly from said support means through said at least one hole of said support means;
   c. cutting said downwardly protruded portion of said wadding material of said assembly, while still pressing downwardly the same portion of said assembly to further cause the same portion of said assembly to be dented;
   d. advancing said assembly to a backing sheet laminating station; and
   e. sticking a sheet of backing material onto the wadding material side of said assembly by means of backing sheet sticking means, while pressing against said backing sheet sticking means the same portion of said assembly to continue to cause the same portion of said assembly to be dented, whereby a finished product having at least one indent, which consists of a circular indent portion and wrinkles radially made around said circular indent portion appreciated as an ornamental pattern therein may be produced.

15. A method of forming trim cover as defined in claim 14, wherein said step (a) further comprises the step of feeding said assembly into a space between said support means and pressure means extending from a position above said support means to a position above said backing sheet sticking means, said pressure means including at least two pressure rollers being in corotating relation, each of which is provided on a circumferential surface thereof with at least one substantially anchor-like projection corresponding to said at least one substantially star-like hole of said support means, one of which pressure rollers is located above said support means, and the other of which pressure rollers is located above said backing sheet sticking means; said pressing of the portion of said assembly in said steps (b) and (c) is carried out through said substantially at least one anchor-like projection of said one of said at least two pressure rollers; and said pressing of the portion of said assembly in said step (e) is carried out through said at least one substantially anchor-like projection of said the other of said at least two pressure rollers.

16. A method of forming trim cover as defined in claim 15, wherein said cutting of said downwardly protruded portion of said wadding material of said assembly is carried out by means of a roll cutter, said support means is rotatable drum-like support means and said at least one star-like hole is formed at the circumferential wall of said drum-like support means, said roll cutter being located in said drum-like support means so as to be rotated independently of said rotatable drum-like support means.

17. A method of forming trim cover as defined in any one of claims 1 to 10, wherein said support means is plate-like support means.

18. A method of forming trim cover as defined in any one of claims 1 to 10, wherein said cutting of said downwardly protruded portion of said wadding material of said assembly is carried out by means of a roll cutter which is located below said at least one hole of said support means.

19. An apparatus for forming trim cover comprising:
   a frame;
   support means carried by said frame for receiving and supporting thereon an assembly of wadding material and a sheet of covering material, with the covering material side of said assembly being turned upward, said support means being provided with at least one hole;
   means carried by said frame and located next to said support means and for sticking a sheet of backing material onto the wadding material side of said assembly;
   means carried by said frame and located above said support means and backing sheet sticking means and for advancing said assembly while pressing downwardly a portion of said assembly substantially positionally corresponding to said at least one hole of said support means, said assembly advancing and pressing means including at least first and second pressure rollers, each of which is provided with a circumferential projection, said first pressure roller is located above said support means in a manner such that said circumferential projection of said first pressure roller aligns with said at least one hole of said support means, so that said circumferential projection of said first pressure roller can press downwardly the portion of said assembly positionally corresponding to said at least one hole of said support means to cause the same portion to be dented by rotation of said first pressure roller to cause a portion of said wadding material of said assembly positionally corresponding to said at least one hole of said support means to be protruded downwardly from said support means through said at least one hole of said support means;
   cutter means carried by said frame in a manner to be located below said at least one hole of said support means and for cutting the portion of said wadding material of said assembly which is protruded downwardly from said support means through said at least one hole of said support means by said circumferential projection of said first pressure roller; and said second pressure roller is located above said backing sheet sticking means in a manner such that said circumferential projection of said second pressure roller can press downwardly said assembly, which is sent into a space between said second pressure roller and said backing sheet sticking means, at the same portion as said circumferential projection of said first pressure roller did, and when said sticking means sticks said backing sheet onto the wadding material side of said assembly, said circumferential projection of said second pressure roller presses against said backing sheet sticking means the portion of said assembly while indenting the portion of said assembly.

20. An apparatus for forming trim cover as defined in claim 19, wherein said support means is provided with at least one straight slit-like hole; and said first and second pressure rollers are each provided with a belt-like circumferential projection.

21. An apparatus for forming trim cover as defined in claim 19, wherein said support means is provided with at least one straight slit-like hole; and said first and second pressure rollers are each provided with a circumferential tapered projection.

22. An apparatus for forming trim cover as defined in claim 21, wherein said at least one hole of said support means comprises an elongated straight portion and a plurality of substantially V-shaped portions arranged at both margins of said elongated portion along an axis of elongation thereof; and said first and second pressure rollers are each provided with a circumferential projection, said projection comprising a roll portion on a rotatable shaft and two series of teeth portion being arranged around said rotatable shaft in a manner to interpose said roll portion therebetween.

23. An apparatus for forming trim cover comprising:
a frame;
drum-like support means rotatably carried by said frame for receiving and supporting thereon an assembly of wadding material and a sheet of covering material, with said covering material side of said assembly being turned upward, said drum-like support means being provided with at least one substantially star-like hole which consists of a circular portion and a plurality of substantially inverted V-shape portions arranged along a circumference of said circular portion;
means carried by said frame and located next to said support means and for sticking a sheet of backing material onto the wadding material side of said assembly;
means carried by said frame and located above said support means and backing sheet sticking means and for advancing said assembly while pressing downwardly a portion of said assembly substantially positionally corresponding to said at least one hole of said drum-like support means, said assembly advancing and pressing means including at least first and second pressure rollers, each of which is provided on a circumferential surface thereof with at least one substantially anchor-like projections, said first pressure roller is located above said support means in a manner such that said at least one substantially anchor-like projection of said first pressure roller can engage with said at least one said first pressure roller can press downwardly a portion of said assembly positionally corresponding to said at least one substantially star-like hole of said drum-like support means to cause the same portion of said assembly to be dented by rotation of said first pressure roller to cause a portion of said wadding material of said assembly positionally corresponding to said at least one substantially star-like hole of said drum-like support means to be protruded downwardly from said drum-like support means through said at least one substantially star-like hole of said drum-like support means;
roll cutter means rotatably carried by said frame in a manner to be located in said drum-like support means and being able to rotate independently of said rotatable drum-like support means and for cutting the portion of said wadding material of said assembly which is protruded downwardly form said support means through said at least one hole of said support means by said at least one substantially anchor-like projection of said first pressure roller; and
said second pressure roller is located above said backing sheet sticking means in a manner such that said at least one anchor-like projection of said second pressure roller can press downwardly the assembly, which is sent into a space between said second pressure roller and said backing sheet sticking means, at the same portion thereof as said at least one anchor-like projection of said first pressure roller did, and when said sticking means sticks said backing sheet onto the wadding material side of said assembly, said at least one substantially anchor-like projection of said second pressure roller presses against said backing sheet sticking means the portion of said assembly while indenting the portion of said assembly.

24. An apparatus for forming trim cover comprising:
a frame;
support means carried by said frame for receiving and supporting thereon an assembly of wadding material and a sheet of covering material, with said covering material side of said assembly being turned upward, said support means being provided with at least one substantially meandrous slit-like hole;
means carried by said frame and located next to said support means and for sticking a sheet of backing material onto the wadding material side of said assembly;
plate-like pressure means located above said support means and adapted to slide said assembly to said backing sheet sticking means while pressing said assembly against said support means to cause a portion of the wadding material side of said assembly corresponding to said at least one substantially meandrous slit-like hole of said support means to be protruded downwardly from said support means through said at least one substantially meandrous slit-like hole of said support means, said plate-like pressure means being provided with a substantially meandrous line-like tapered projection corresponding to said at least one substantially meandrous slit-like hole of said support means, said substantially meandrous line-like tapered projection being material side of said assembly to be protruded downwardly from said support means through said at least one substantially meandrous slit-like hole of said support means; and cutter means carried by said frame in a manner to be located below said at least one substantially meandrous slit-like hole of said support means and for cutting the portion of said wadding material of said assembly which is protruded downwardly from said support means through said at least one substantially meandrous slit-like hole of said support means by said substantially meandrous line-like tapered projection of said pressure means.

* * * * *